US012547695B1

(12) United States Patent
Roy et al.

(10) Patent No.: US 12,547,695 B1
(45) Date of Patent: Feb. 10, 2026

(54) DATA SECURITY

(71) Applicant: Amazon Technologies, Inc., Seattle, WA (US)

(72) Inventors: Sourav Roy, Sunnyvale, CA (US); Robin Alan Golden, Los Gatos, CA (US); Tigran Sukiasyan, Vancouver (CA); Lawrence Webley, Woodinville, WA (US); Somasekhar Sista, San Ramon, CA (US); Francisco Lopez Liebana, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 161 days.

(21) Appl. No.: 17/994,246

(22) Filed: Nov. 25, 2022

(51) Int. Cl.
*G06F 21/44* (2013.01)
*G06F 21/31* (2013.01)
*H04L 9/40* (2022.01)

(52) U.S. Cl.
CPC .............. *G06F 21/44* (2013.01); *G06F 21/31* (2013.01); *H04L 63/20* (2013.01)

(58) Field of Classification Search
CPC ......... G06F 21/44; G06F 21/31; H04L 63/20; H04W 12/062
See application file for complete search history.

(56) References Cited

U.S. PATENT DOCUMENTS

| | | | |
|---|---|---|---|
| 10,412,022 B1* | 9/2019 | Tang | H04L 47/781 |
| 10,785,219 B1* | 9/2020 | Streete | H04L 63/0876 |
| 2005/0108551 A1* | 5/2005 | Toomey | H04L 9/3297 |
| | | | 713/185 |
| 2011/0066841 A1* | 3/2011 | Goodrow | H04L 43/0894 |
| | | | 714/4.2 |
| 2015/0236915 A1* | 8/2015 | Mohammed | H04L 41/0893 |
| | | | 709/223 |
| 2020/0036603 A1* | 1/2020 | Nieves | H04L 63/0876 |
| 2021/0182417 A1* | 6/2021 | Pang | G06F 21/6227 |
| 2021/0243194 A1* | 8/2021 | Nelsen | G06Q 20/405 |

* cited by examiner

*Primary Examiner* — William R Korzuch
*Assistant Examiner* — Aditya Sriram
(74) *Attorney, Agent, or Firm* — Davis Wright Tremaine LLP

(57) ABSTRACT

Described techniques and systems can obtain a request to process metric data based on observation of a computer-implemented resource. The request can be authenticated. Based at least on authenticating the request, the request can be augmented to include data linked to the computer-implemented resource. The metric data can be processed based on the augmented request, the processing can include disseminating the metric data.

18 Claims, 8 Drawing Sheets

DATA SECURITY

BACKGROUND

Computer systems can include many computing nodes. Computing nodes can include load balancers, routers, virtual machines, processors, computer-implemented storage, workstations, and the like. These computing nodes communicate data. The communicated data can be exposed to machines and/or humans positioned to compromise the communicated data.

Efforts are ongoing to improve the security of computer systems. Some of these security improvements are designed to prevent unauthorized access and tampering of communicated data. Nonetheless, preventing unauthorized access and tampering of communicated data is challenging, and bad actors who compromise communicated data cause computer systems to operate with inefficiencies.

BRIEF DESCRIPTION OF THE DRAWINGS

Various techniques will be described with reference to the drawings, in which.

DETAILED DESCRIPTION

Figure 1:
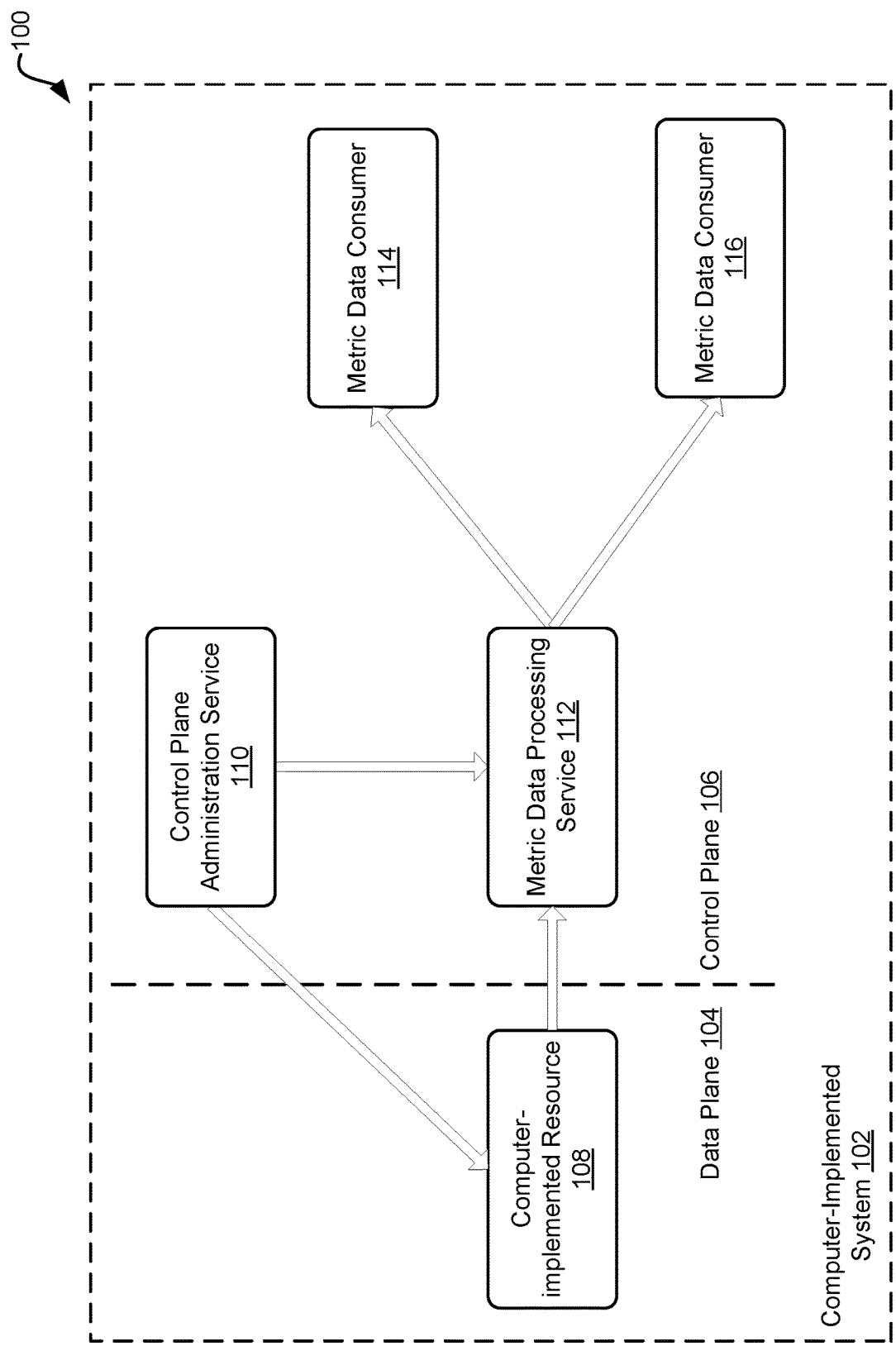
FIG. 1 illustrates an example system environment that can process metric data, according to at least one embodiment.

Systems and techniques to securely communicate data are described. This disclosure presents a computer-implemented framework to ensure a recipient of communicated data can trust the data is received in an uncompromised state and that the data is provided from a known or expected source. Confidence in communicated data is paramount to ensure computer-implemented resources function efficiently and remain available to customers of the online service provider.

An online service provider can provide services that involve communicating data between various computer-implemented resources. These services can include virtual servers in the cloud, scalable compute capacity, storage volumes, servers, database services, network connectivity, managed programmatic interfaces, such as application programming interfaces (APIs), data streaming services, machine learning, security and threat detection services, and so forth. The data communicated between various computer-implemented resources can be exposed to machines and/or humans positioned to compromise the communicated data. Compromised data can cause operational inefficiencies in the computer-implemented resources.

The disclosed framework to ensure that communicated data, in particular the metadata of the data, is received in an uncompromised state can be applied to a service that monitors computer-implemented resources and collects telemetry or metric data based on work performed by those computer-implemented resources. The service can deploy a computer-implemented agent to observe the work performed by the computer-implemented resources and based on that observation generate metric data. The metric data generated by the computer-implemented agent can include data corresponding to a percent of allocated processors utilized by the computer-implemented resources, disk reads and/or disk writes performed by the computer-implemented resources, an amount of data read or written by the computer-implemented resources, an amount of data communicated or received by the computer-implemented resources, an amount of processor credits utilized by the computer-implemented resources, use of network resources by the computer-implemented resources, and so forth.

Metric data collected by the computer-implemented agent, based on work performed by computer-implemented resources of a system's data plane, can be communicated to a computer-implemented service deployed at the system's control plane. The metric data can include identifying information or metadata corresponding to the computer-implemented resource that performed work corresponding to the collected metric data. For example, the metadata can include an instance identifier of the computer-implemented resource, a cluster identifier corresponding to a cluster of computer-implemented resources that the computer-implemented resource is associated with, customer account information associated with the computer-implemented resource, an identifier of the type of data included in the metric data, and other information that might be useful to the computer-implemented service deployed at the control plane. If the metadata is tampered with or otherwise modified by a bad actor, this can cause improper dissemination of the metric data, incorrect billing for use of computer-implemented resources, decreased customer satisfaction due to the security breach of the associated metric data, and/or falsification of the metric data. Furthermore, a determination that metadata was tampered with can require taking comprised computer-implemented resources off-line while the security breach is investigated. Removing computer-implemented resources from the system can negatively affect efficiencies of the overall operation of the system.

To mitigate the possibility of a bad actor compromising metric data, the described security framework involves an enhanced registration process for computer-implemented resources deployed at the data plane. The registration process can be used at any time during the deployment of a computer-implemented resource. A metric data service of the control plane can be used by an administrator with authorized access to register a computer-implemented resource deployed at the data plane.

The administrator uses the metric data service to identify the computer-implemented resource deployed at the data plane. For example, the administrator can use the metric data service to supply an identifier associated with the computer-implemented resource. This identifier is expected to be supplied to services of the control plane when the computer-implemented resource authenticates in advance of or during the process of communicating metric data to services of the control plane. In some examples, a computer-implemented agent of the data plane works in conjunction with the computer-implemented resource to deliver metric data to services of the control plane. Such an arrangement would still require authentication in advance of or during the process of communicating metric data to the services of the control plane. In some examples, the computer-implemented agent and the computer-implemented resources are integrated.

In addition to the identifier supplied by the administrator when the computer-implemented resource is registered, the administrator can also associate trusted identifiers associated with the computer-implemented resource, and link those trusted identifiers to the identifier of the computer-implemented resource. This registration process performed by the administrator can involve hosting the identifier of the computer-implemented resource and the trusted identifiers linked to the identifier in a database maintained securely by the control plane. Trusted identifiers can include account identifier information associated with the computer-implemented resource, a cluster identifier associated with a cluster of computer-implemented resources that the computer-implemented resource is associated with, a customer identifier associated with the computer-implemented resource, and the like. These trusted identifiers can be customer chosen and/or chosen by the administrator. Furthermore, these trusted identifiers can be securely held in storage of the control plane.

In some examples, the administrator of the control plane supplies the identifier of the computer-implemented resource and the trusted identifiers linked to the identifier through an API call. The API can be a protected API that is accessed by an administrator successfully authenticated to a system of the control plane.

The stored identifier of the computer-implemented resource and the associated trusted identifiers can be used to ensure that metric data and the associated metadata are communicated from the data plane to the control plane in an un-tampered state. Specifically, communication of the metric data to the control plane can require an authentication process performed by the computer-implemented resource or agent in order to gain access to the control plane for the purpose of completing delivery of the metric data. A successful authentication at the data plane exposes an identifier of the computer-implemented resource associated with the metric data. This identifier can be an instance identifier or other identifier of the computer-implemented resource that is exposed and provided to the metric data service of the control plane at the time of successful authentication.

The metric data service uses the identifier of the computer-implemented resource to search for trusted identifiers linked to the identifier. For example, the metric data service can locate the trusted identifiers by querying a database storing the trusted identifiers using the identifier as a basis for the query. These trusted identifiers are appended to or added to metadata included with the metric data. The metric data service can perform the appending process. In some examples, the trusted identifiers appended or added to the metadata supersede or replace similar or corresponding identifiers included in the metadata, as received by the metric data service of the control plane. Specifically, some or more of the original identifying information of the metadata can be compromised prior to communication or during communication of the metric data from the data plane to the control plane. Replacing or superseding the original identifying information in the metadata with the trusted identifiers improves the trustworthiness of the metadata and the metric data that is associated with the metadata. In some examples, the metadata is augmented to remove some or all of the original identifying information of the computer-implemented resource, and the metadata can be further augmented to include some or all of the trusted identifiers. In some examples, the metadata is modified to include a section that includes the trusted identifiers. The section can include identifying data or information, such as a header or section header, that indicates that the section includes the trusted identifiers.

The trusted identifiers associated with the metadata of the metric data can be used to route, through the control plane, the metric data to recipients subscribed to receive metadata associated with the computer-implemented resource. Additionally, the trusted identifiers can at least in part allow for filtering types of metric data to subscribed recipients. Furthermore, the trusted identifiers can be used as part of a mechanism to throttle an amount of metric data consumed by the metric data service at the control plane.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example system environment 100 that can process metric data, according to at least one embodiment. The example system environment 100 can include a computer-implemented system 102. The computer-implemented system 102 can comprise various computational resources, including virtual computer instances, applications, services, processes, web servers, computer storage, database instances, networking components, and so on. In some embodiments, the computer-implemented system 102 can be hosted in the cloud by an online service provider.

The computer-implemented system 102 can comprise hosted multi-tenant provider networks. The computer-implemented system 102 can be associated with a number of networks, such as the Internet and/or one or more private networks. Clients, such as client computing devices or other interfaces, can use the network to interface with the computer-implemented system 102. Clients can include entities or individuals that contract with an operator associated with the computer-implemented system 102 to obtain computational services provided by the operator of the computer-implemented system 102. In some embodiments, the client can be resource owners, resource developers, compliance managers, other users or entities, and so on.

In at least one embodiment, as used in any implementation described herein, unless otherwise clear from context or stated explicitly to contrary, terms such as "service" and nominalized verbs (e.g., module, resource, component, element, node, entity, and/or other terms) each refers to any combination of software logic, firmware logic, hardware logic, and/or circuitry configured to provide functionality described herein. In at least one embodiment, software may be embodied as a software package, code and/or instruction set or instructions, and "hardware," as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. In at least one embodiment, modules may, collectively or individually, be embodied as circuitry that forms part of a larger system, for example, an integrated circuit (IC), system-on-chip (SoC), and so forth. Additionally, in at least one embodiment, as used in any implementation described herein, messages, communications, responses, acknowledgments, and the like can comprise data that carries the payload (e.g., information) of the messages, communications, responses, acknowledgments, and the like.

As illustrated in FIG. 1, the system 102 can include a data plane 104 and a control plane 106. In at least one embodiment, the data plane 104 can include components (e.g., hardware and software) including a plurality of storage entities including storage devices (such as hard disk drives), storage nodes, servers, and the like. In various embodiments, storage entities are designed to provide high storage capacity and low operational costs. In at least one embodiment, the control plane 106 can include components (e.g., hardware and software) useful for managing aspects of the data storage of the data plane 104. In at least one embodiment, a set of data management APIs or other such interfaces are provided that allow a user or customer to make calls into services of the control plane 106 to perform certain tasks relating to the data storage and/or management of services.

In at least one embodiment, the data plane 104 can include one or more computer-implemented resources 108. In at least one embodiment, the computer-implemented resource 108 is one or more nodes to store data. Alternatively, or in addition, the computer-implemented resource 108 is a virtual machine or instance, processor, application, server, network component, application, and the like. The computer-implemented resource 108 can belong to or be assigned to a customer of an online service provider. In at least one embodiment, the online service provider generates metric data based on use of the computer-implemented resource 108. This generated metric data can be used to generate one or more invoices for payment by the customer based on use of the computer-implemented resource 108.

The control plane 106 can include a control plane administration service 110. The control plane administration service 110 can be maintained and administered by users with access to the control plane 106. In at least one embodiment, various APIs can be exposed through authorized access to the control plane administration service 110. These APIs can be called by the users, such as administrators of the control plane 106, to manage resources of the data plane 104 and services of the control plane 106.

A user, through authorized access to the control plane administration service 110, can register the computer-implemented resource 108 with a metric data processing service 112. In at least one embodiment, the control plane administration service 110 and the metric data processing service 112 are an integrated service that executes the functions of both services 110 and 112. The control plane administration service 110 can also be used to modify settings of the computer-implemented resource 108 and/or deregister the computer-implemented resource 108.

The control plane administration service 110 can receive a request to register, deregister, or modify operational features of the computer-implemented resource 108. In at least one embodiment, the request is received from a customer responsible for the computer-implemented resource 108. The request received by the control plane administration service 110 can identify the computer-implemented resource 108. The identification of the computer-implemented resource 108 can be a unique identifier of the computer-implemented resource 108. The unique identifier can be an instance identifier of the computer-implemented resource 108, a resource identifier of the computer-implemented resource 108, and the like. In at least one embodiment, the unique identifier is a string. In at least one embodiment, the string can comprise numbers, letters, symbols, and/or a mix of numbers, letters, or symbols.

The control plane administration service 110 can require proper authentication by the customer. Specifically, the control plane administration service 110 can process credentials associated with the customer and/or the computer-implemented resource 108 before registering the computer-implemented resource 108 with the metric data processing service 112.

The control plane administration service 110, in response to receiving the request to register the computer-implemented resource 108, can locate one or more additional identifying information associated with the computer-implemented resource 108. In at least one embodiment, the control plane administration service 110 cannot locate the one or more additional identifying information in computer-implemented resources of the computer-implemented system 102 and/or the control plane 106. Alternatively, or in addition, the control plane administration service 110 can receive the one or more additional identifying information from the customer that is responsible for the computer-implemented resource 108. In at least one embodiment, the one or more additional identifying information can be included with the request received by the control plane administration service 110. In at least one embodiment, the additional identifying information is trusted identifying information to be associated with the computer-implemented resource 108.

The one or more additional identifying information can include customer account information associated with the computer-implemented resource 108 and the customer that makes the request to the control plane administration service 110 to register the computer-implemented resource 108. Alternatively, or in addition, the one or more additional identifying information can include a cluster identifier that identifies a collection of computer-implemented resources that the computer-implemented resource 108 belongs to. The one or more additional identifying information can include a customer identifier and/or customer account information assigned to the customer responsible for the computer-implemented resource 108. In at least one embodiment, the one or more additional identifying information can include a resource identifier of the computer-implemented resource 108. The additional identifying information can comprise numbers, letters, or symbols, and/or a mix of numbers, letters, or symbols. In at least one embodiment, the additional identifying information can comprise cryptographic information, such as cryptographic hashes and the like. Similarly, the identifying information of the computer-implemented resource 108 can comprise cryptographic information.

Once the computer-implemented resource 108 is registered by the control plane administration service 110, the control plane administration service 110 can inform the metric data processing service 112, through messaging and the like, that the computer-implemented resource 108 is authorized to communicate metric data for processing by the metric data processing service 112.

While the computer-implemented resource 108 operates, metric data can be generated. In at least one embodiment, a computer-implemented agent generates the metric data on behalf of the computer-implemented resource 108. The computer-implemented agent can be integrated with the computer-implemented resource 108 or the computer-implemented agent can be external of the computer-implemented resource 108. The metric data can indicate the amount of processing performed by the computer-implemented resource 108, how much storage the computer-implemented resource 108 is using, an amount of networking resources used by the computer-implemented resource 108, a value of data reads and/or writes accumulated by the computer-implemented resource 108, and so forth. The metric data can be accumulated over a predetermined amount of time and communicated to the control plane 106 from time to time or added to a stream of data for processing by the control plane 106.

As indicated, at various intervals or constantly, the metric data can be communicated to the metric data processing service 112. In at least one embodiment, the communicated metric data can include associated metadata. The communicated metric data and associated metadata can be included in a request, message, or other similar communication. The associated metadata can comprise identifying information of the computer-implemented resource 108. In an example, the associated metadata includes at least an identifier of the computer-implemented resource 108. Additional identifying information of the computer-implemented resource 108 can also be included in the metadata. In at least one embodiment, the metadata can include information or data identifying the metric data categories included in the metric data, such as one or more metric data names (e.g., CPU utilization, network use in and out, network packets in and out, disk reads, disk writes). Some or all of the information included in the metadata can be compromised before it is communicated to the metric data processing service 112 and/or during communication of the metadata in the metric data to the metric data processing service 112. Compromised or tampered with metadata can result in numerous system-level inefficiencies. For example, computer-implemented resources might be deployed to determine how the metadata was compromised or tampered with. Additionally, system administrators may take the computer-implemented resource 108 off-line during the investigation to determine how the metadata was compromised or tampered with. In another example, system administrators may throttle the use of the computer-implemented resource 108 during an investigation related to the compromise or tampered with metadata.

The computer-implemented resource 108 and/or the customer of the computer-implemented resource 108 can perform an authentication process (e.g., authn and/or authz) with systems of the control plane 106 as part of communicating metric data and associated metadata to the metric data processing service 112. The authentication process performed by the control plane 106 can expose identifying information of the computer-implemented resource 108 to the control plane 106. In at least one embodiment, this identifying information can include an identifier assigned to the computer-implemented resource 108. In at least one embodiment, the identifying information includes an instance or resource identifier assigned to the computer-implemented resource 108 when it is created by the control plane administration service 110.

The metric data processing service 112, or other resource of the control plane 106, can use the identifying information of the computer-implemented resource 108, exposed during the authentication process, to query a computer-implemented storage of the control plane 106 to locate one or more trusted identifiers associated with computer-implemented resource 108. In at least one embodiment, these one or more trusted identifiers are assigned to the computer-implemented resource 108 at the time the control plane administration service 110 allocates the computer-implemented resource 108. In at least one embodiment, the one or more trusted identifiers are held in a secure manner (e.g., encrypted) in resources of the control plane 106. In at least one embodiment, the one or more trusted identifiers are not exposed to entities external to the resources associated with the control plane 106. In at least one embodiment, the one or more trusted identifiers of the computer-implemented resource 108 are chosen by administrators of the control plane administration service 110 and/or the customer responsible for the computer-implemented resource 108.

In at least one embodiment, the metadata included with the metric data communicated by the computer-implemented resource 108 is augmented to include one or more of the trusted identifiers. In at least one embodiment, the one or more trusted identifiers augment the metadata by adding the one or more trusted identifiers to the metadata. Alternatively, the one or more trusted identifiers augment the metadata by replacing identifying information of the computer-implemented resource 108 included in the metadata when it was received at the metric data processing service 112. In at least one embodiment, augmenting the metadata is performed by the metric data processing service 112 after proper authentication by the computer-implemented resource 108 with one or more resources of the control plane 106. In at least one embodiment, the metadata is augmented to remove some or all of the original identifying information of the computer-implemented resource 108, and the metadata can be further augmented to include some or all of the trusted identifiers. In some examples, the metadata is modified to include a section that includes the trusted identifiers. The section can include identifying data or information, such as a header or section header, that indicates that the section includes the trusted identifiers.

With the augmented metadata in place for the metric data received from the computer-implemented resource 108, the metric data processing service 112 can deliver the metric data to one or more metric data consumers 114 and 116. In at least one embodiment, one or more of the metric data consumers 114 and 116 are computer-implemented instances, such as client devices, virtual machines, processing entities, or the like. In at least one embodiment, one or more of the metric data consumers 114 and 116 is an end user that uses a virtual or software/hardware machine, such as a client device or the like, to obtain metric data. In at least one embodiment, the metric data processing service 112 in cooperation with the control plane administration service 110 can receive and maintain subscriptions to metric data to be received from the computer-implemented resource 108. In at least one embodiment, these subscriptions can identify the metric data to be received based on metric data name, such as metric data identifying information maintained by the data plane 104 and/or the control plane 106. In addition, the subscriptions can identify one or more of the trusted identifiers to be included in the metadata of the metric data received by the metric data processing service 112.

In at least one embodiment, one or more of the metric data consumers 114 and 116 can register with the control plane administration service 110 to receive certain types of metric data. The registration process can involve supplying one or more names of the metric data linked to metric data types that one or more of the metric data consumers 114 and 116 desire to consume. Furthermore, the registration process can involve supplying identifying information, such as resource identifier or instance identifier, of computer-implemented resource(s). Once registered, the control plane administration service 110 can route the metric data corresponding to one or more names of the metric data and further corresponding to the computer-implemented resource(s) specified by one or more of the metric data consumers 114 and 116. In at least one embodiment, the metric data includes the augmented metadata as described herein. This augmented metadata can include a section with trusted identifying information for the computer-implemented resource(s) in can further include a section with trusted identifying information for the computer-implemented resource(s). In at least one embodiment, information contained in the augmented metadata can be used by the control plane administration service 110 and/or one or more of the metric data consumers 114 and 116 to filter the metric data. For example, the control plane administration service 110 and/or one or more of the metric data consumers 114 and 116 can elect to filter the metric data based on one or more of the trusted identified information for the computer-implemented resource(s) and/ or based on one or more of the un-trusted identifying information for the computer-implemented resource(s).

Metadata of metric data from the computer-implemented resource 108 can include metric data identifying information corresponding to the metric data payload delivered to the metric data processing service 112. The metric data identifying information of the subscriptions in concert with the metric data identifying information included in the metadata of the metric data received from the computer-implemented resource 108 can serve as a basis for delivering metric data to the metric data consumer 114 and/or metric data consumer 116. As described, the subscriptions can identify one or more of the trusted identifiers to be included in the metadata of the metric data received by the metric data processing service 112. Delivery of metric data to the metric data consumer 114 and/or the metric data consumer 116 can be dependent on the metric data name included in the subscription and one or more of the trusted identifiers identified in the subscription. Use of such a subscription process enhances the veracity of the metric data received by the metric data consumer 114 and/or the metric data consumer 116. In at least one embodiment, the metric data is streamed to the metric data consumer 114 and/or the metric data consumer 116 based on metric data subscriptions held and administered by the metric data processing service 112.

In at least one embodiment, in addition, the one or more trusted identifiers included in the augmented metadata can serve as a basis for throttling an amount of metric data received from the computer-implemented resource 108. Alternatively, or in addition, metric data identifier, such as a metric data name, can serve as a basis for throttling the amount of metric data received from the computer-implement resource 108.

Figure 2:
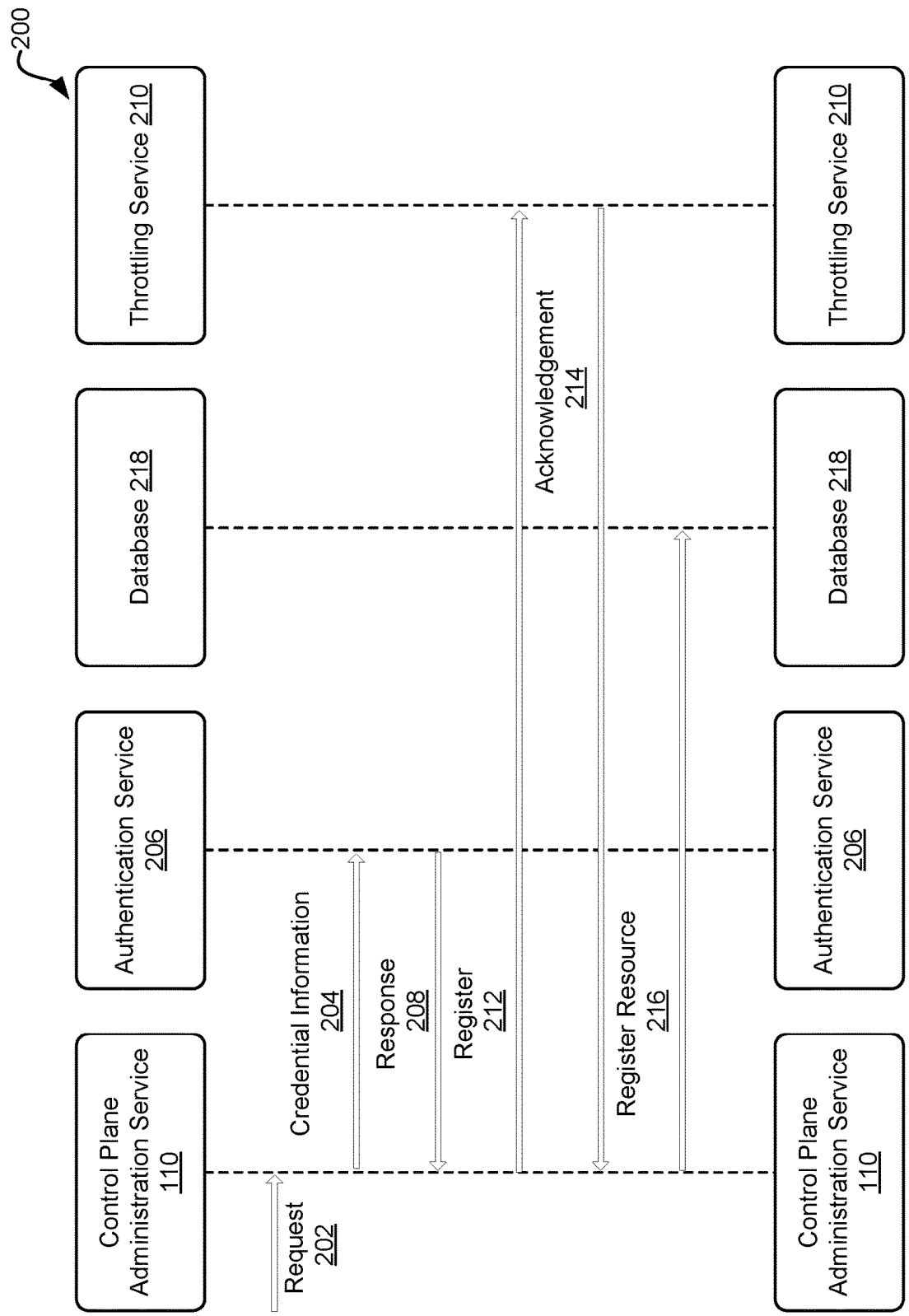
FIG. 2 illustrates an example registration process for a computer-implemented resource that is to communicate metric data, according to at least one embodiment.

FIG. 2 illustrates an example registration process 200 for a computer-implemented resource that is to communicate metric data, according to at least one embodiment. In at least one embodiment, the computer-implemented resource can correspond to the computer-implemented resource 108. In at least one embodiment, a request 202 to recognize the computer-implemented resource is received by the control plane administration service 110. The request 202 can be provided by a customer responsible for the computer-implemented resource. In at least one embodiment, the request 202 can be a request to allocate the computer-implemented resource. In at least one embodiment, the request 202 can include identifying information of the computer-implemented resource. In at least one embodiment, the identifying information can include a resource identifier of the computer-implemented resource, an identifier of the computer-implemented resource, a cluster identifier associated with a cluster of computer-implemented resources that the computer-implemented resource is associated with, and so forth. In at least one embodiment, the identifying information is embedded in credential information 204.

In at least one embodiment, the request 202 undergoes an authentication process by the control plane administration service 110. Specifically, the request can include the credential information 204 for the computer-implemented resource and/or the customer associated with the computer-implemented resource. The credential information 204 can be communicated to an authentication service 206 by the control plane administration service 110.

The authentication service 206 can verify the credential information 204. The verification process of the credential information 204 can expose the identifying information of the computer-implemented resource. In at least one embodiment, the credential information 204 is confirmed through an authn/authz authentication process.

The authentication service 206 generates a response 208 to processing and confirming the credential information 204. In at least one embodiment, the response 208 is communicated to the control plane administration service 110. In at least one embodiment, one or more trusted identifiers for the computer-implemented resource are linked to the identifying information of the computer-implemented resource. In at least one embodiment, the one or more trusted identifiers are allocated by the control plane administration service 110. In at least one embodiment, the one or more trusted identifiers are included in the request 202. In at least one embodiment, the one or more trusted identifiers are allocated by the control plane administration service 110 and some or more of the one or more trusted identifiers are included in the request 202. In at least one embodiment, the one or more trusted identifiers of the computer-implemented resource are stored and securely held by the control plane administration service 110.

In at least one embodiment, the control plane administration service 110 registers 212 the computer-implemented resource with a throttling service 210. In at least one embodiment, the registration process with the throttling service 210 involves communicating one or more of the trusted identifiers to the throttling service 210. An acknowledgment 214 is communicated to the control plane administration service 110 by the throttling service 210 upon successful registration of the computer-implemented resource with the throttling service 210. In at least one embodiment, the throttling service 210 can throttle metric data from the computer-implemented resource based on a throttling parameter and the one or more trusted identifiers. Alternatively, at least one embodiment, the registration process with the throttling service 210 involves communicating one or more metric names identifying metric data types to the throttling service 210. In at least one embodiment, the throttling service 210 can throttle metric data from the computer-implemented resource based on a throttling parameter and the one or more metric names. In at least one embodiment, the throttling parameter identifies a maximum amount of metric data that can be received over some predetermined period. When the received metric data exceeds the throttling parameter, the throttling service 210 in conjunction with the control plane administration service 110 can discontinue receiving metric data from an associated computer-implemented resource, generate an administration message indicating the throttling parameter was exceeded, and/or disregard some or all of the metric data determined to exceed the throttling parameter.

The control plane administration service 110 can register 216 the computer-implemented resource by storing the identifying information of the computer-implemented resource in a database 218. In addition, the one or more trusted identifiers are stored in the database 218 as searchable or queryable using the identifying information.

Figure 3:
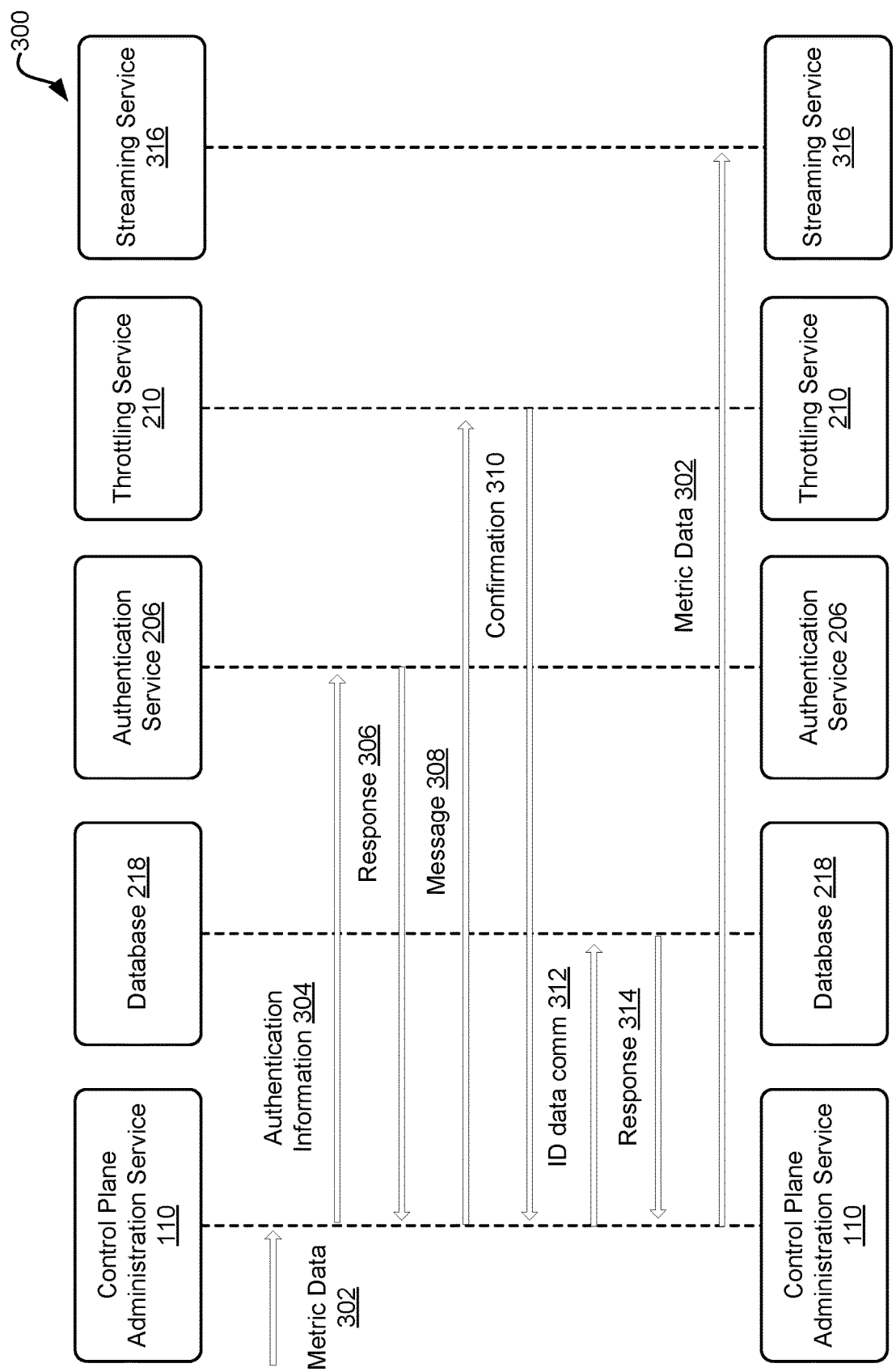
FIG. 3 illustrates an example metric data ingestion process for a computer-implemented resource that is to communicate metric data, according to at least one embodiment.

FIG. 3 illustrates an example metric data ingestion process 300 for a computer-implemented resource that is to communicate metric data, according to at least one embodiment. The control plane administration service 110 can receive metric data 302. In at least one embodiment, the metric data 302 is received from the computer-implemented resource 108. In at least one embodiment, the metric data 302 includes metadata. In at least one embodiment, the metric data 302 also includes authentication information 304, such as credential information.

The authentication information 304 can be forwarded to the authentication service 206 by the control plane administration service 110. The authentication service 206 can process the authentication information 304. Specifically, the authentication service 206 can process the authentication information 304 to confirm the authenticity, through an authn/authz process, for example, of the authentication information 304 provided by the computer-implemented resource 108. Confirming the authenticity of the authentication information 304 can expose identification information or identifying information of the computer-implemented resource 108. This identifying information can also be included in the metadata received with the metric data 302.

The authentication service 206 generates a response 306 confirming the authenticity of the authentication information 304. The response 306 can include the identifying information of the computer-implemented resource 108. The response 306 can be communicated to the control plane administration service 110.

The control plane administration service 110 can receive the response 306. The control plane administration service 110 can use the identifying information included with the response 306 to confirm the amount of metric data 302 received by the control plane administration service 110 conforms with one or more throttling parameters of the throttling service 210. The control plane administration service 110 can forward the identifying information and one or more trusted identifiers of the computer-implemented resource 108 to the throttling service 210 as part of a message 308. Furthermore, the message 308 can indicate an amount of metric data 302 that was received by the control plane administration service 110 over some predetermined period. The throttling service 210 can use the identifying information and/or the one or more trusted identifiers and the indicated amount of metric data 302 received to determine if the amount of metric data 302 exceeds a throttling parameter for a metric data received from the computer-implemented resource 108. The confirmation 310 that the throttling parameters were not exceeded can be forwarded to the control plane administration service 110.

The control plane administration service 110 can generate one or more trusted identifiers for the computer-implemented resource 108. In at least one embodiment, the control plane administration service 110 obtains the one or more trusted identifiers from a customer responsible for the computer-implemented resource 108. In at least one embodiment, the control plane administration service 110 links the one or more trusted identifiers for the computer-implemented resource 108 to the identifying information of the computer-implemented resource 108. In at least one embodiment, the identifying information for the computer-implemented resource 108 as well as the one or more trusted identifiers for the computer-implemented resource 108 are forwarded to the throttling service 210 as part of a message. The message can also include instructions for the throttling service 210 to throttle an amount of metric data received from the computer-implemented resource 108 based on one or more of the trusted identifiers and a throttling parameter. In at least one embodiment, the throttling service 210 provides a confirmation once it has processed the message.

The control plane administration service 110 can augment metadata associated with the metric data 302 to include the one or more trusted identifiers. Augmenting the metadata with the one or more trusted identifiers can include replacing some or all of the identifying information included in the metadata. Furthermore, augmenting the metadata with the one or more trusted identifiers can include verifying the metadata includes the identifying information for the computer-implemented resource 108 determined from processing credential information for the computer-implemented resource 108. In at least one embodiment, augmenting the metadata includes adding the identifying information for the computer-implemented resource 108 determined from processing credential information for the computer-implemented resource 108. In at least one embodiment, augmenting the metadata includes replacing the identifying information for the computer-implemented resource 108 included in the metadata with the identifying information determined from n processing credential information for the computer-implemented resource 108. In at least one embodiment, the control plane administration service 110 links the identifying information for the computer-implemented resource 108 to the one or more trusted identifiers associated with the computer-implemented resource 108.

The control plane administration service 110 can communicate the identifying information for the computer-implemented resource 108 and the linked one or more trusted identifiers associated with the computer-implemented resource 108 to the database 218. The database 218 stores the identifying information for the computer-implemented resource 108 and the linked one or more trusted identifiers associated with the computer-implemented resource 108. In at least one embodiment, the one or more trusted identifiers are stored in the database 218 as being queryable using the identifying information for the computer-implemented resource 118 as a basis. The database 218 provides a confirmation that the identifying information for the computer-implemented resource 118 and the one or more trusted identifiers associated with the computer-implemented resource 118 are hosted by the database 218.

In at least one embodiment, the control plane administration service 110 queries the database 218 in a communication 312 that includes the identifying information of the computer-implemented resource 108. As described, the identifying information of the computer-implemented resource 108 can be obtained from an authentication process performed by the control plane administration service 110 and/or identifying information included in metadata of the metric data 302 received by the control plane administration service 110. In at least one embodiment, the communication 312 and the included identifying information is used by the database 218 to query for one or more trusted identifiers linked to the identifying information of the computer-implemented resource 108. Based on the query, the database 218 locates the one or more trusted identifiers. The located one or more trusted identifiers are returned to the control plane administration service 110 in a response 314.

In at least one embodiment, the control plane administration service 110 modifies the metadata of the metric data 302 to include the one or more trusted identifiers received in the response 314. The metric data 302 with the modified metadata is communicated to a streaming service 316. In at least one embodiment, the streaming service 316 analyzes the modified metadata to identify one or more identifiers associated therewith and related to the computer-implemented resource 108 that generated or communicated the metric data 302. In at least one embodiment, the streaming service 316 uses the one or more identifiers (e.g., the trusted one or more identifiers) to determine portions of the metric data 302 to be delivered to one or more consumers of metric data. In at least one embodiment, the streaming service 316 can reference a database containing information of subscribers to the metric data 302.

Figure 4:
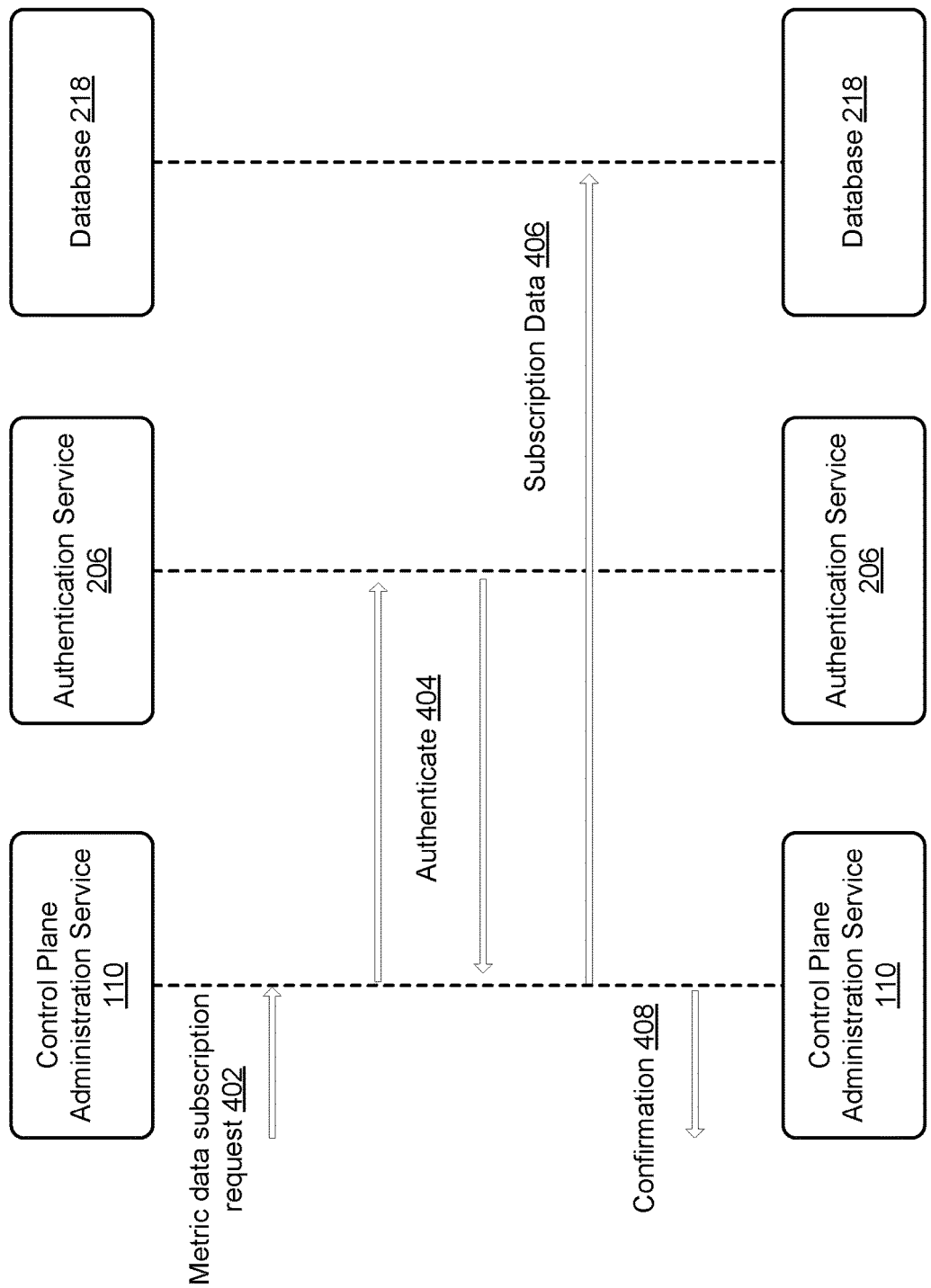
FIG. 4 illustrates an example metric data subscription process for a computer-implemented resource that is to receive metric data, according to at least one embodiment.

FIG. 4 illustrates an example metric data subscription process 400 for a computer-implemented resource that is to receive metric data, according to at least one embodiment. The control plane administration service 110 can receive a metric data subscription request 402. The metric data subscription request 402 can include data identifying names of one or more metric data that a computer-implemented resource would like to subscribe to. In addition, the metric data subscription request 402 can identify one or more identifiers, such as one or more trusted identifiers, that are to serve to filter the metric data, such as the metric data generated by the computer-implemented resource 108. Additionally, the metric data subscription request 402 can include credential information used to authenticate 404 the computer-implemented resource that communicated the metric data subscription request 402. The control plane administration service 110 can interface with the authentication service 206 to authenticate 404 the computer-implemented resource that made the metric data subscription request 402.

The control plane administration service 110 can forward the subscription data 406 of the metric data subscription request 402 to the database 218. The subscription data can be stored in the database 218 and used to route metric data to the metric data subscriber. The control plane administration service 110 can communicate with the computer-implemented resource that provided the metric data subscription request 402 by sending a confirmation 408 that the computer-implement resource has been subscribed to the metric data identified in the metric data subscription request 402.

Figure 5:
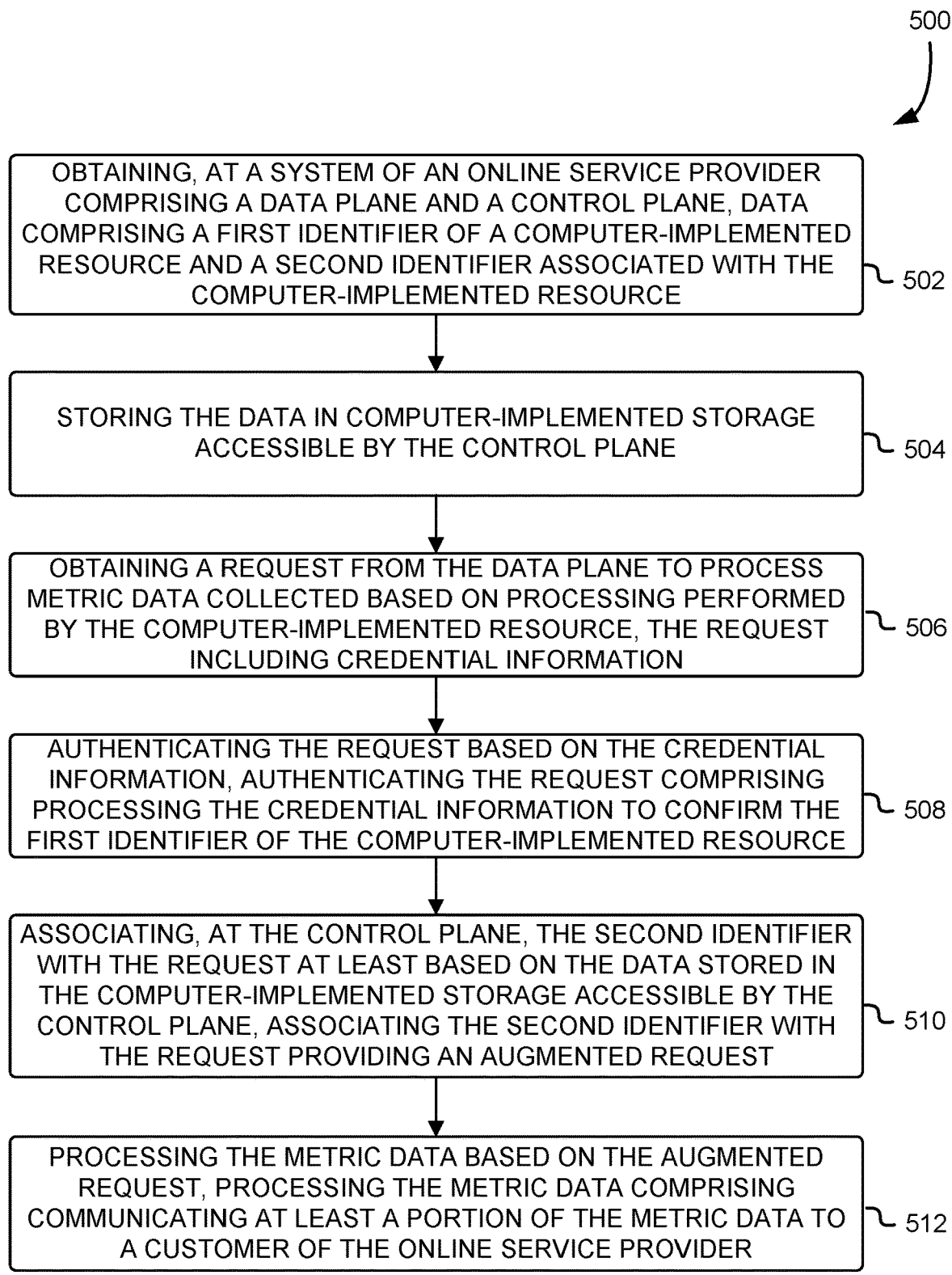
FIG. 5 illustrates an example flow diagram that may be associated with one or more of the described system environments to process metric data, according to at least one embodiment.

FIG. 5 illustrates an example flow diagram 500 that may be associated with one or more of the described system environments to process metric data, according to at least one embodiment. In some implementations, the acts of the flow diagram 500 are executed by one or more computing devices of the example system environments described herein. The example system environments may execute computer-executable instructions incorporating at least some of the processing acts of the flow diagram 500 to provide metric data processing according to at least one of the embodiments described herein.

The particular implementation of the technologies disclosed herein is a matter of choice dependent on the performance and other requirements of the computing device. Accordingly, the logical operations, also referred to as acts, described herein are referred to variously as states, operations, structural devices, acts, or modules. These states, operations, structural devices, acts, and modules can be implemented in hardware, software, firmware, special-purpose digital logic, and any combination thereof. It should be appreciated that more or fewer operations can be performed than shown in the figures and described herein. These operations can also be performed in a different order than those described herein. It should also be understood that the methods described herein can be ended at any time and need not be performed in their entireties.

Some or all operations of the methods described herein, and/or substantially equivalent operations, can be performed by execution of computer-readable instructions included on computer-storage media. The term "computer-readable instructions," and variants thereof, as used in the description and claims, is used expansively herein to include routines, applications, application modules, program modules, system modules, programs, components, data structures, algorithms, and the like. Computer-readable instructions can be implemented on various system configurations, including single-processor or multiprocessor systems, minicomputers, mainframe computers, distributed computer systems, personal computers, hand-held computing devices, microprocessor-based, programmable consumer electronics, combinations thereof, and the like.

Thus, it should be appreciated that the logical operations described herein are implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules might be implemented in software, in firmware, in special-purpose digital logic, and any combination thereof.

At 502, a system of an online service provider comprising a data plane and a control plane, obtains data comprising a first identifier of a computer-implemented resource and a second identifier associated with the computer-implemented resource. In at least one embodiment, the first identifier and the second identifier are obtained as part of a registration process for the computer-implement resource. In at least one embodiment, one or more services of the control plane obtain the first identifier and the second identifier. In at least one embodiment, the second identifier is a trusted identifier for the computer-implemented resource. In at least one embodiment, the second identifier is generated by one or more services of the control plane. In at least one embodiment, the second identifier is provided by an entity registering the computer-implement resource.

At 504, data is stored in computer-implemented storage accessible by the control plane. In at least one embodiment, the data is stored in a database.

At 506, a request is obtained from the data plane to process metric data collected based on processing performed by the computer-implemented resource, the request including credential information.

At 508, the request is authenticated based on the credential information, authenticating the request comprising processing the credential information to confirm the first identifier of the computer-implemented resource.

At 510, the control plane associates the second identifier with the request at least based on the data stored in the computer-implemented storage accessible by the control plane, associating the second identifier with the request providing an augmented request.

At 512, the metric data is processed based on the augmented request, processing the metric data comprising communicating at least a portion of the metric data to a customer of the online service provider.

In at least one embodiment, one or more of the services 108, 110, and 112 perform one or more of the acts 504-512. In at least one embodiment, one or more of the services 206, 210, and 316 perform one or more of the actions 504-512. In at least one embodiment, one or more components of one or more of environment 100 and processes 200, 300, and 400 perform one or more of the actions 504-512.

Figure 6:
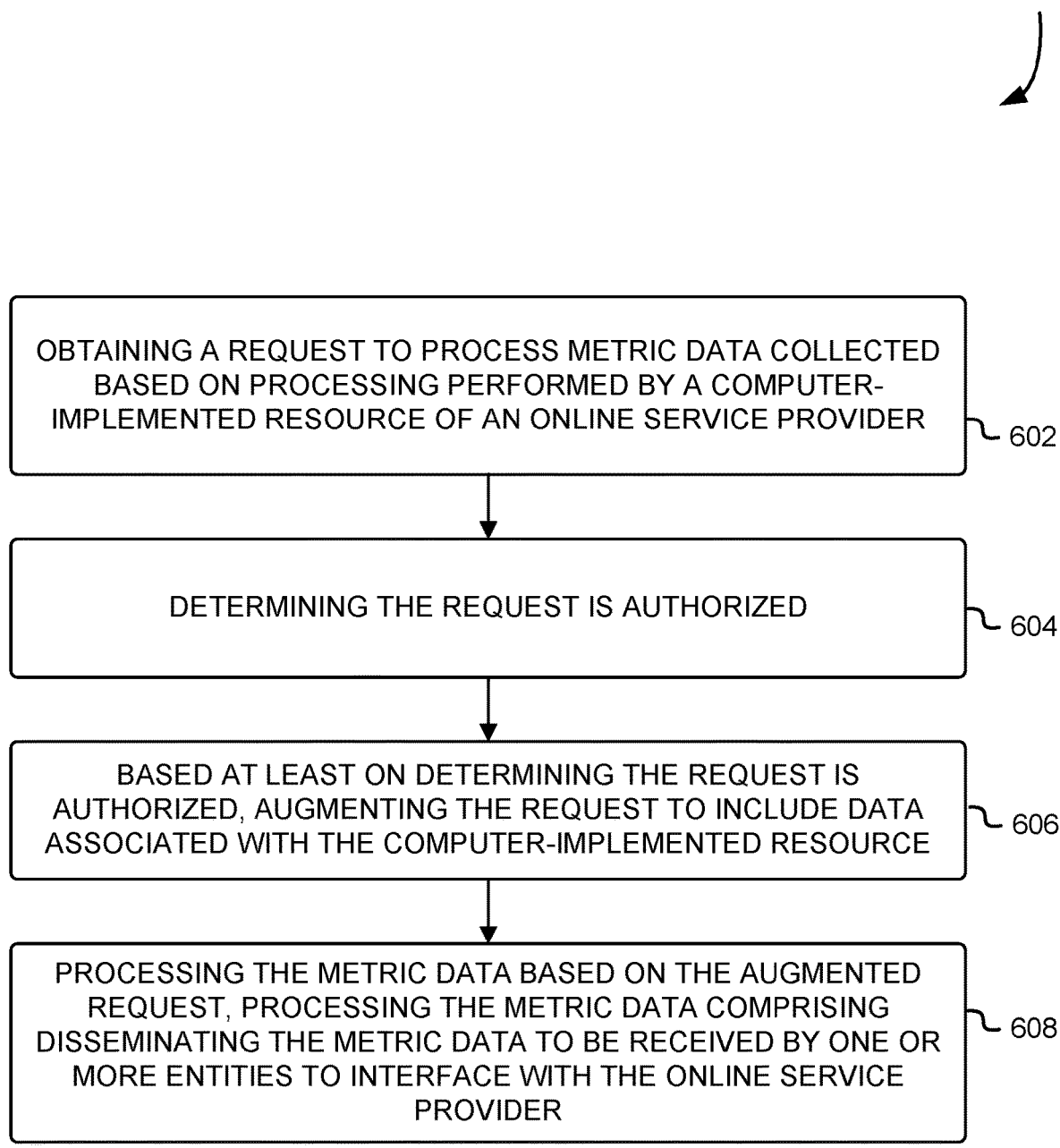
FIG. 6 illustrates an example flow diagram that may be associated with one or more of the described system environments to process metric data, according to at least one embodiment.

FIG. 6 illustrates an example flow diagram 600 that may be associated with one or more of the described system environments to process metric data, according to at least one embodiment. In some implementations, the acts of the flow diagram 600 are executed by one or more computing devices of the example system environments described herein. The example system environments may execute computer-executable instructions incorporating at least some of the processing acts of the flow diagram 600 to provide processing of metric data, according to at least one of the embodiments described herein.

At 602, a request is obtained to process metric data collected based on processing performed by a computer-implemented resource of an online service provider.

At 604, the request is determined to be authorized.

At 606, based at least on determining the request is authorized, augment the request to include data associated with the computer-implemented resource. In at least one embodiment, augmenting the request includes augmenting a metadata of the request.

At 608, process the metric data based on the augmented request, processing the metric data comprising disseminating the metric data to be received by one or more entities to interface with the online service provider.

In at least one embodiment, one or more of the services 108, 110, and 112 perform one or more of the acts 602-608. In at least one embodiment, one or more of the services 206, 210, and 316 perform one or more of the actions 602-608. In at least one embodiment, one or more components of one or more of environment 100 and processes 200, 300, and 400 perform one or more of the actions 602-608.

Figure 7:
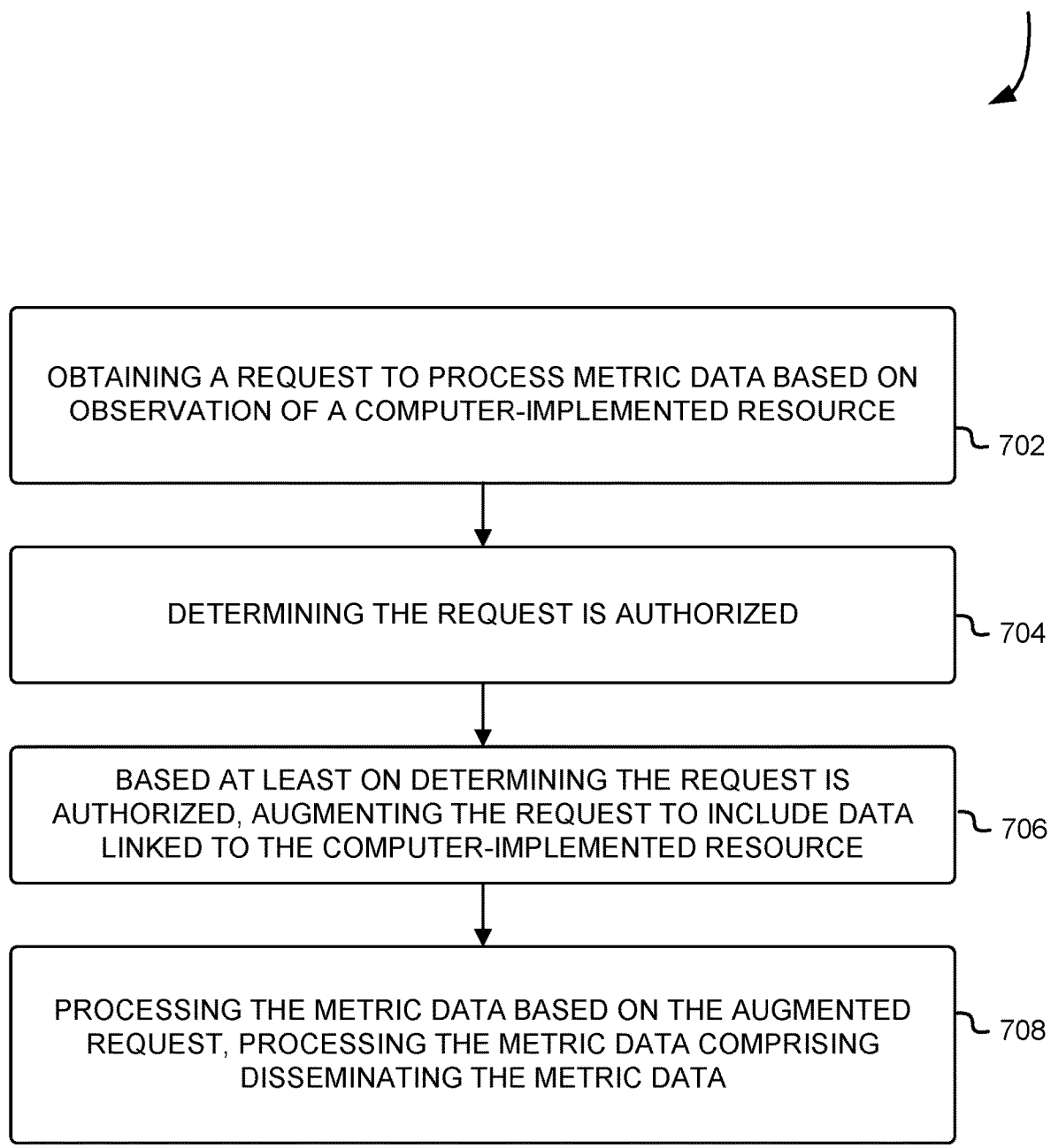
FIG. 7 illustrates an example flow diagram that may be associated with one or more of the described system environments to process metric data, according to at least one embodiment.

FIG. 7 illustrates an example flow diagram 700 that may be associated with one or more of the described system environments to process metric data, according to at least one embodiment. In some implementations, the acts of the flow diagram 700 are executed by one or more computing devices of the example system environments described herein. The example system environments may execute computer-executable instructions incorporating at least some of the processing acts of the flow diagram 700 to provide processing of metric data, according to at least one of the embodiments described herein.

At 702, a request is obtained to process metric data based on observation of a computer-implemented resource.

At 704, the request is determined to be authorized.

At 706, based at least on determining the request is authorized, augment the request to include data linked to the computer-implemented resource. At least one embodiment, augmenting the request includes augmenting metadata of the request At 708, the metric data is processed based on the augmented request, processing the metric data comprising disseminating the metric data.

In at least one embodiment, one or more of the services 108, 110, and 112 perform one or more of the acts 702-708. In at least one embodiment, one or more of the services 206, 210, and 316 perform one or more of the actions 702-708. In at least one embodiment, one or more components of one or more of environment 100 and processes 200, 300, and 400 perform one or more of the actions 702-708.

Figure 8:
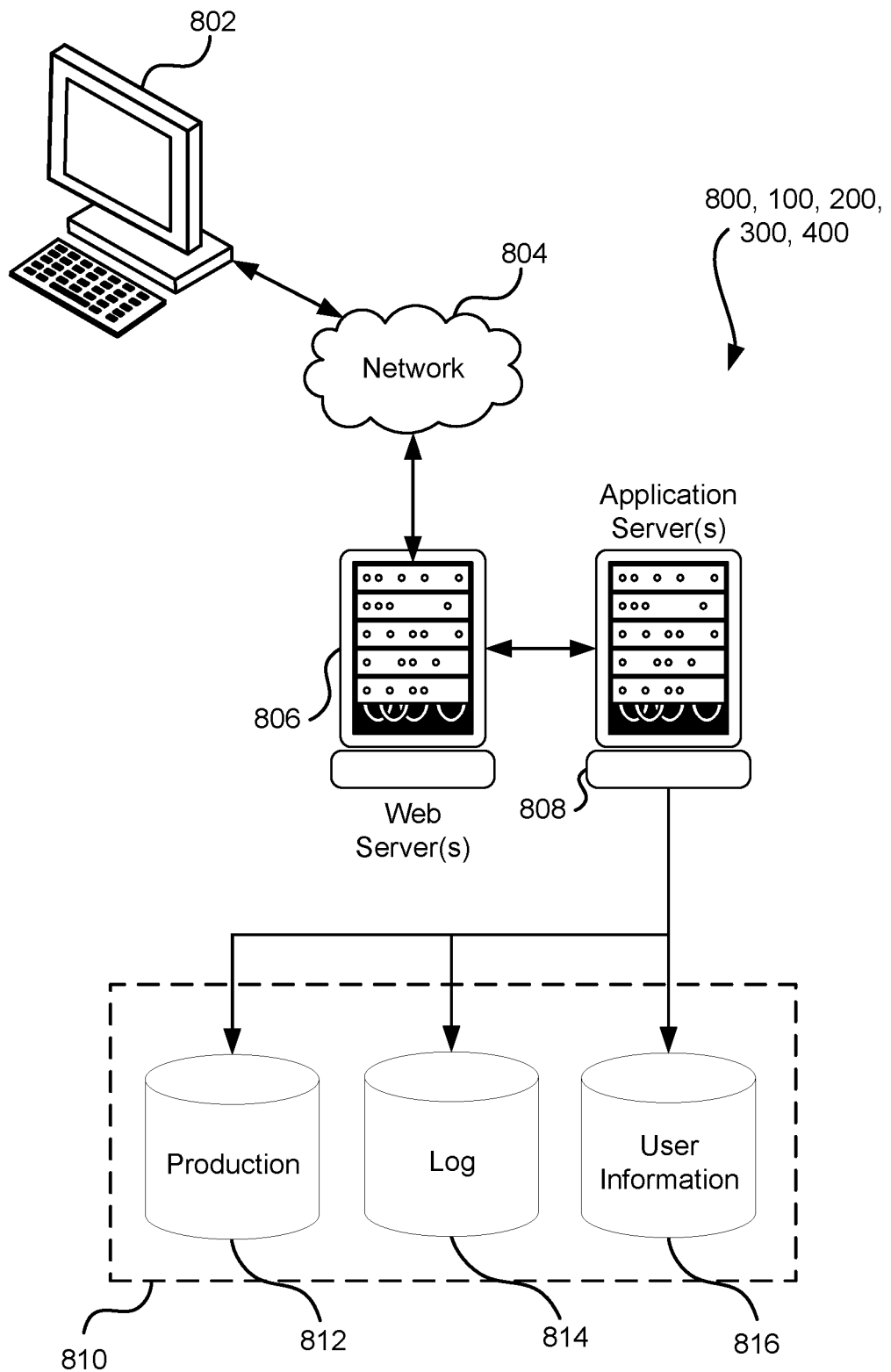
FIG. 8 illustrates a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto, and the application server 808 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
obtaining, at a system of an online service provider comprising a data plane and a control plane, data comprising a first identifier of a computer-implemented resource and a second identifier associated with the computer-implemented resource, the second identifier comprising a trusted identifier for the computer-implemented resource, the data plane including the computer-implemented resource comprising one or more hardware components to store data, and the control plane comprising a computer-implemented component, comprising another one or more hardware components, to manage data storage performed by the data plane;
storing the data in computer-implemented storage accessible by the control plane;
obtaining a request from the data plane to process metric data collected based on processing performed by the computer-implemented resource, the request including credential information and the first identifier;
authenticating the request based on the credential information, authenticating the request comprising processing the credential information to confirm the first identifier of the computer-implemented resource;

associating, at the control plane, the second identifier with the request at least in part by querying the data stored in the computer-implemented storage using the first identifier to locate the second identifier, associating the second identifier with the request providing an augmented request including the first identifier and the second identifier; and processing the metric data based on the augmented request, processing the metric data comprising communicating at least a portion of the metric data to a customer of the online service provider.

2. The computer-implemented method of claim 1, wherein the first identifier of the computer-implemented resource is an instance identifier assigned to the computer-implemented resource and the second identifier comprises at least customer information associated with the computer-implemented resource, and wherein obtaining the data is caused by calling a programmatic interface accessible through authenticated access to the control plane.

3. The computer-implemented method of claim 1, wherein at least a portion of the data is included in a database comprising a plurality of identifiers maintained securely by the control plane.

4. The computer-implemented method of claim 1, wherein the data comprising the first identifier of the computer-implemented resource and the second identifier associated with the computer-implemented resource further comprises a parameter to limit ingestion of metric data, the parameter linked to the first identifier.

5. A system, comprising:
one or more processors; and
memory that stores computer-executable instructions that are executable by the one or more processors to cause the system to:
obtain a request, at a control plane, to process metric data collected based on processing performed by a computer-implemented resource associated with a data plane of an online service provider, the data plane including the computer-implemented resource comprising one or more hardware components to store data, and the control plane comprising a computer-implemented component, comprising another one or more hardware components, to manage data storage performed by the data plane;
determine the request is authorized based on credential information, determining the request is authorized comprising processing credential information to confirm a first identifier of the computer-implemented resource, the request including the credential information and the first identifier;
based at least on determining the request is authorized, query a computer-implemented storage using the first identifier of the computer-implemented resource to locate a second identifier associated with the computer-implemented resource, the second identifier comprising a trusted identifier for the computer-implemented resource, and augment the request to include the first identifier and the located second identifier, thereby forming an augmented request comprising the first identifier and the second identifier; and
process the metric data based on the augmented request, processing the metric data comprising disseminating the metric data to be received by one or more entities to interface with the online service provider.

6. The system of claim 5, wherein the request is generated by a computer-implemented component of the data plane, and wherein augmenting the request is performed by the computer-implemented component of the control plane.

7. The system of claim 5, wherein the memory that stores the computer-executable instructions that are executable by the one or more processors are further to cause the system to:
obtain the data associated with the computer-implemented resource, the data at least comprising the first identifier; and
store the data in computer-implemented storage hosted by the online service provider.

8. The system of claim 5, wherein the first identifier of the computer-implemented resource is an instance identifier assigned to the computer-implemented resource and the second identifier comprises at least customer information associated with the computer-implemented resource.

9. The system of claim 5, wherein determining the request is authorized comprises evaluating credential information associated with the computer-implemented resource to determine the first identifier associated with the computer-implemented resource.

10. The system of claim 5, wherein the memory that stores the computer-executable instructions that are executable by the one or more processors are further to cause the system to: store the first and second identifiers in response to an application programming interface (API) call, the second identifier stored to be located based on the query using the first identifier.

11. The system of claim 5, wherein disseminating the metric data to be received by the one or more entities is based at least in part on the first identifier or the second identifier.

12. A computer-implemented method, comprising:
obtaining a request, generated by a computer-implemented component of a data plane, to process metric data based on observation of a computer-implemented resource, the request obtained by a control plane, the control plane comprising one or more hardware components to manage data storage performed by the data plane;
determining the request is authorized based on credential information, determining the request is authorized comprising processing credential information to confirm a first identifier of the computer-implemented resource, the request including the credential information and the first identifier;
based at least on determining the request is authorized, querying computer-implemented storage, using the first identifier, to locate a second identifier linked to the computer-implemented resource, and augmenting the request to include at least a portion of the data linked to the computer-implemented resource, the augmented request including the first identifier and the second identifier associated with the computer-implemented resource, the second identifier comprising a trusted identifier for the computer-implemented resource; and
processing the metric data based on the augmented request, processing the metric data comprising disseminating the metric data.

13. The computer-implemented method of claim 12, wherein the computer-implemented resource is associated with the data plane of a system, and wherein augmenting the request to include the portion of the data linked to the computer-implemented resource is performed by the one or more hardware components of the control plane of the system.

14. The computer-implemented method of claim 12, further comprising:
  obtaining the data linked to the computer-implemented resource; and
  storing the data in computer-implemented storage.

15. The computer-implemented method of claim 12, wherein the first identifier of the computer-implemented resource is an instance identifier assigned to the computer-implemented resource and the second identifier comprises at least customer information associated with the computer-implemented resource.

16. The computer-implemented method of claim 12, wherein the portion of the data is included in a database comprising a plurality of identifiers maintained securely by the control plane.

17. The computer-implemented method of claim 12, further comprising storing the first and second identifiers in response to an application programming interface (API) call, the second identifier stored to be located based on a query using the first identifier.

18. The computer-implemented method of claim 12, wherein disseminating the metric data is based at least in part on the data linked to the computer-implemented resource.

\* \* \* \* \*